United States Patent
Chen et al.

(10) Patent No.: US 11,321,850 B2
(45) Date of Patent: May 3, 2022

(54) PRESENCE DETECTION SYSTEM

(71) Applicant: Himax Imaging Limited, Tainan (TW)

(72) Inventors: Po-Chang Chen, Tainan (TW);
Yuan-Chih Peng, Tainan (TW);
Wei-Chieh Yang, Tainan (TW);
Wei-Chun Mai, Tainan (TW)

(73) Assignee: Himax Imaging Limited, Tainan (TW)

( * ) Notice: Subject to any disclaimer, the term of this patent is extended or adjusted under 35 U.S.C. 154(b) by 98 days.

(21) Appl. No.: 16/924,673

(22) Filed: Jul. 9, 2020

(65) Prior Publication Data

US 2022/0012900 A1    Jan. 13, 2022

(51) Int. Cl.
*G06K 9/00* (2022.01)
*G06T 7/246* (2017.01)
*G06T 7/73* (2017.01)
*G06T 7/80* (2017.01)

(52) U.S. Cl.
CPC ............... *G06T 7/246* (2017.01); *G06T 7/73* (2017.01); *G06T 7/80* (2017.01); *G06T 2207/10016* (2013.01); *G06T 2207/30196* (2013.01)

(58) Field of Classification Search
CPC .. G06T 7/246; G06T 7/73; G06T 7/80; G06T 2207/10016; G06T 2207/3019
See application file for complete search history.

(56) References Cited

U.S. PATENT DOCUMENTS

| | | | | |
|---|---|---|---|---|
| 9,321,173 | B2* | 4/2016 | Kikkeri | G05D 1/0246 |
| 2004/0240708 | A1* | 12/2004 | Hu | G06K 9/6211 |
| | | | | 382/103 |
| 2012/0092376 | A1* | 4/2012 | Jones | G06F 3/0481 |
| | | | | 345/647 |
| 2014/0075230 | A1* | 3/2014 | Suggs | H02J 7/35 |
| | | | | 713/323 |
| 2014/0314273 | A1* | 10/2014 | Muninder | G06K 9/6232 |
| | | | | 382/103 |
| 2016/0191948 | A1* | 6/2016 | Van Beek | H04N 19/14 |
| | | | | 375/240.16 |
| 2018/0082133 | A1* | 3/2018 | Guarneri | G06T 7/215 |
| 2020/0193609 | A1* | 6/2020 | Dharur | G06T 7/11 |

* cited by examiner

*Primary Examiner* — Amara Abdi
(74) *Attorney, Agent, or Firm* — Donald E. Stout; Stout, Uxa & Buyan, LLP (57) ABSTRACT

A presence detection system includes a camera that captures an image; an appearance-based detector that detects appearance of an object according to the image, thereby outputting an appearance-detection signal that is asserted when the appearance is detected; a proximity detector that detects motion of the object on a predetermined detection window on the image, thereby outputting a proximity-detection signal that is asserted when the motion is detected; and a fusion unit that receives the appearance-detection signal and the proximity-detection signal, thereby outputting an object-presence signal that is asserted when the appearance-detection signal or the proximity-detection signal is asserted.

12 Claims, 7 Drawing Sheets

PRESENCE DETECTION SYSTEM

BACKGROUND OF THE INVENTION

1. Field of the Invention

The present invention generally relates to presence detection, and more particularly to a human presence detection system and method.

2. Description of Related Art

A human presence detector, such as a proximity sensor, is a sensor capable of detecting the presence of nearby humans without any physical contact. In one example, as disclosed in US2014/0075230, the detection result of the human presence detector may be used to wake up an electronic device from low-power sleep/standby state when a potential user is approaching the proximity of the electronic device. In another example, the detection result of the human presence detector may be used to trigger an alarm when intrusion occurs.

One type of the proximity sensor uses an infrared (IR) light-emitting diode that emits IR light, and an IR sensor that senses reflected IR light to determine proximity of an object. Another type of the proximity sensor adopts triangulation measurement technique to determine proximity of the object. A further type of the proximity sensor utilizes time of flight (ToF) technique to measure the time taken by a light pattern to travel a distance through a medium to determine proximity of the object.

Face detection, as disclosed in US2013/0063611, U.S. Pat. No. 7,155,036, US2004/0081998 and US2012/0081392, is an efficient approach for human detection to determine the human presence by means of detecting the human face. Nevertheless, the face detection substantially relies on clear facial feature. In case of lacking good-quality face image due to face being occluded, out of camera field-of-view or of poor image quality, the face detection may fail.

Motion detection can be an auxiliary mechanism for human detection. It monitors the temporal change across frames and presumes that human motion events would induce detectable differences. Face detection and motion detection are employed in a joint scheme, as disclosed in U.S. Pat. No. 7,409,091 and WO2017098265.

A human presence detector for waking up a device is requested to accurately detect the presence of a potential user from a variety of approaching passer-by. However, it is challenging because the intent to use the device is generally unknown, and only partial body is usually imaged when the human is in close proximity of the device.

Accordingly, above mentioned human presence detectors suffer frequent false detection (and associated trigger) and detection miss. Moreover, the conventional human presence detectors could not efficiently distinguish a potential user (who has intent to use the electronic device) from a passer-by.

A need has thus arisen to propose a novel scheme to overcome drawbacks of the conventional human presence detectors. Particularly, the claimed invention fuses the outputs of face detection and motion detection to determine a probable user who has an intent to use.

SUMMARY OF THE INVENTION

In view of the foregoing, it is an object of the embodiment of the present invention to provide a human presence detection system and method capable of accurately detecting human and distinguishing a potential user from a passer-by.

According to one embodiment, a presence detection system includes a camera, an appearance-based detector, a proximity detector and a fusion unit. The camera captures an image. The appearance-based detector, such as frontal face detector, frontal body detector or frontal upper-body detector, detects appearance of an object according to the image, thereby outputting an appearance-detection signal that is asserted when the appearance is detected. The proximity detector detects motion of the object on a predetermined detection window on the image, thereby outputting a proximity-detection signal that is asserted when the proximity is detected. The fusion unit receives the appearance-detection signal and the proximity-detection signal, thereby outputting an object-presence signal that is asserted when the appearance-detection signal or the proximity-detection signal is asserted.

DETAILED DESCRIPTION OF THE INVENTION

Figure 1:
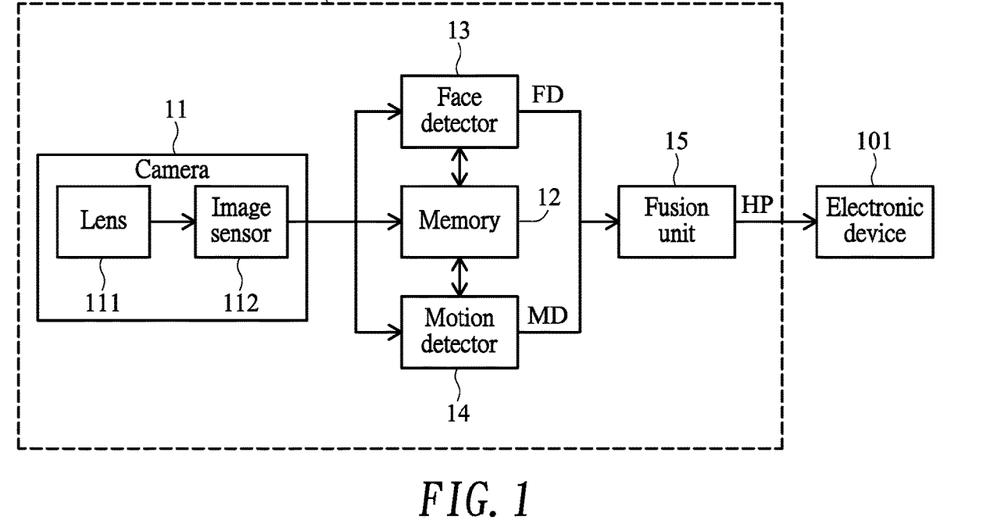
FIG. 1 shows a block diagram illustrating a human presence detection system according to a first embodiment of the present invention.

FIG. 1 shows a block diagram illustrating a human presence detection system 100 according to a first embodiment of the present invention. It is appreciated that the blocks as shown do not necessarily imply that they are physically separated. At least two blocks can be integrated into one entity. For example, blocks 12-15 of the embodiment may be integrated into one entity such as a chip, or the entire human presence detection system 100 may be integrated into a stacked integrated circuit.

In the embodiment, the human presence detection system (system hereinafter) 100 may include a camera 11 configured to capture an image. In one embodiment, the camera 11 may include a lens 111 and an image sensor 112. Specifically, the lens 111 is used to focus optical images of objects onto the image sensor 112, and the image sensor 112 converts the optical images of objects into signals that make the captured image. The system 100 of the embodiment may include a memory 12 configured to temporarily store, among others, the image captured by the camera 11.

Figure 2A:
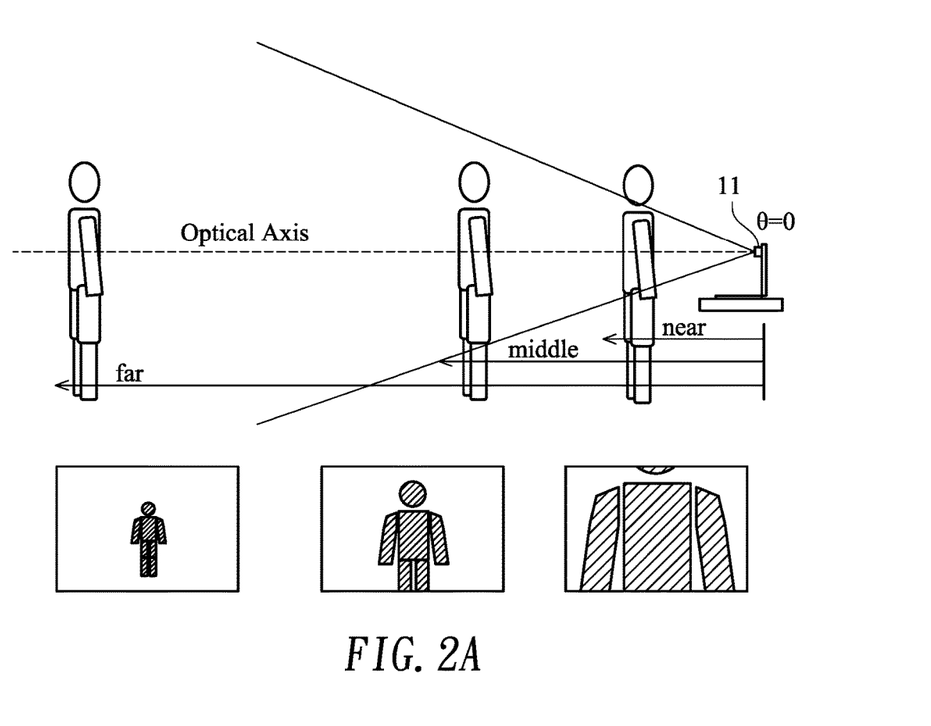
FIG. 2A shows a side view illustrating the camera without tilt and associated captured images.
Figure 2B:
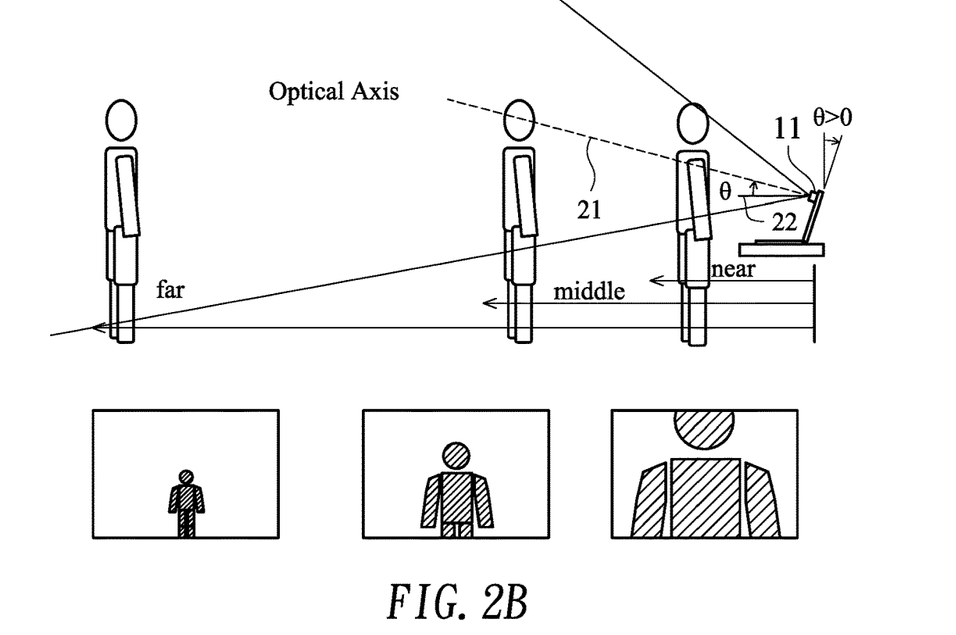
FIG. 2B shows a side view illustrating the camera that tilts upward at the tilt angle and associated captured images.
Figure 2C:
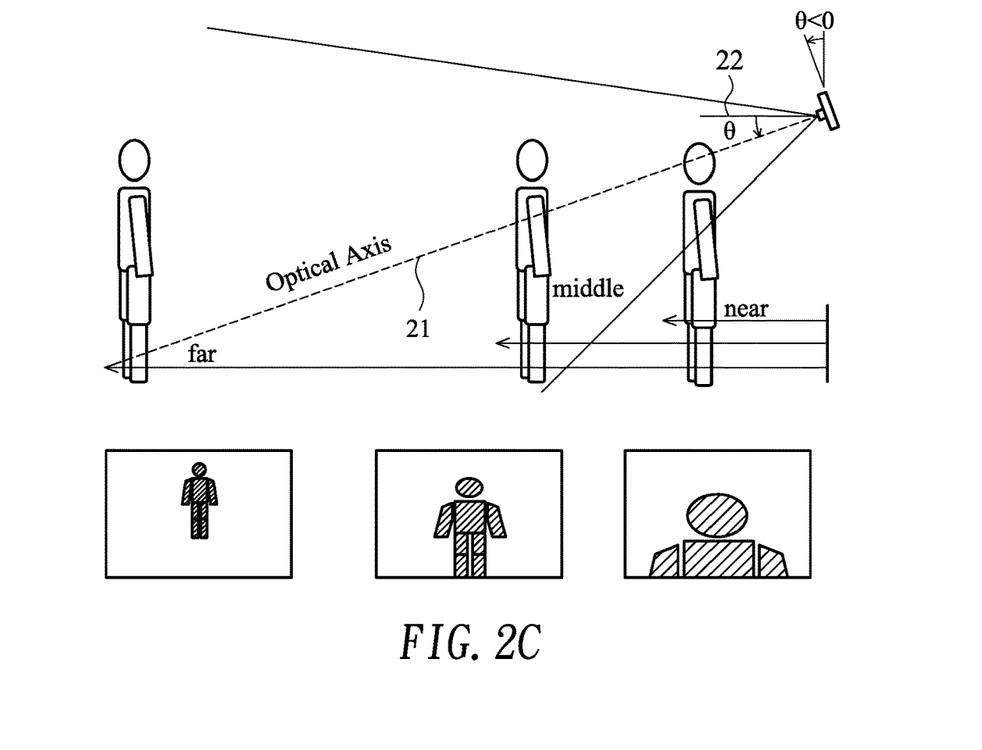
FIG. 2C shows a side view illustrating the camera that tilts downward at the tilt angle and associated captured images.

According to one aspect of the embodiment, the camera 11 may tilt upward (or downward) at a tilt angle. Accordingly, only humans being close to the camera 11 can be located at an end (e.g., upper) portion of a field of view (FOV) of the camera 11 (or the captured image), while humans being far away from the camera 11 appear smaller and are located at another portion of the captured image (or the field of view of the camera 11). FIG. 2A shows a side view illustrating the camera 11 (of a notebook computer) without tilt and associated captured images. In this case, only near-distance or middle-distance human is located at an upper portion of the FOV of the camera 11 (or the captured image). FIG. 2B shows a side view illustrating the camera 11 (of a notebook computer) that tilts upward at the tilt angle θ between an optical axis 21 of the camera 11 and a horizontal line 22 being level with ground and associated captured images. In this case, only near-distance human is located at an upper portion of the FOV of the camera 11 (or the captured image). In a preferred embodiment, the tilt angle of the camera 11 may be in a range of 0-90 degrees. It is noted that, in the embodiment, the camera 11 is disposed at a level below a line of sight of a standing person, and the camera 11 may preferably tilt upward. However, for another embodiment in which the camera 11 is disposed at a level above a line of sight of a standing person, the camera 11 may preferably tilt downward as shown in FIG. 2C, which shows a side view illustrating the camera 11 (disposed on ceiling) that tilts downward at the tilt angle θ between an optical axis 21 of the camera 11 and a horizontal line 22 being level with ground and associated captured images. In this case, only near-distance or middle-distance human is located at a lower portion of the FOV of the camera 11 (or the captured image). The tilted camera 11 as shown in FIG. 2B and FIG. 2C therefore produces a perspective effect that facilitates presence detection of the near-distance and middle-distance human.

In the embodiment, the system 100 may include a face detector (FD) 13 coupled to receive the image captured by the camera 11, and configured to detect a face (of human) in the image. According to a face-detection result, the face detector 13 may output a face-detection signal FD that is asserted (e.g., "1") when a face is detected, or is de-asserted (e.g., "0") when no face is detected. The face detector 13 may adopt conventional face-detection techniques, details of which are thus omitted for brevity. Although the face detector 13 is exemplified in the embodiment, it is appreciated that it may be generalized to an appearance-based detector configured to detect appearance (of an object such as human) such as frontal face, frontal upper body or frontal body for a probable user who has an intent to use. The appearance-based detector may output an appearance-detection signal according to an appearance-detection result.

Figure 3A:
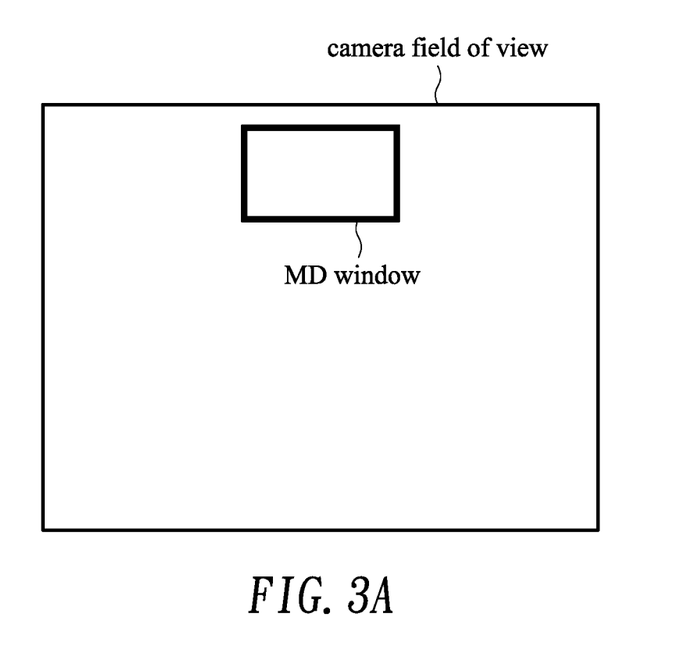
FIG. 3A and FIG. 3B show exemplary motion-detection windows.
Figure 3B:
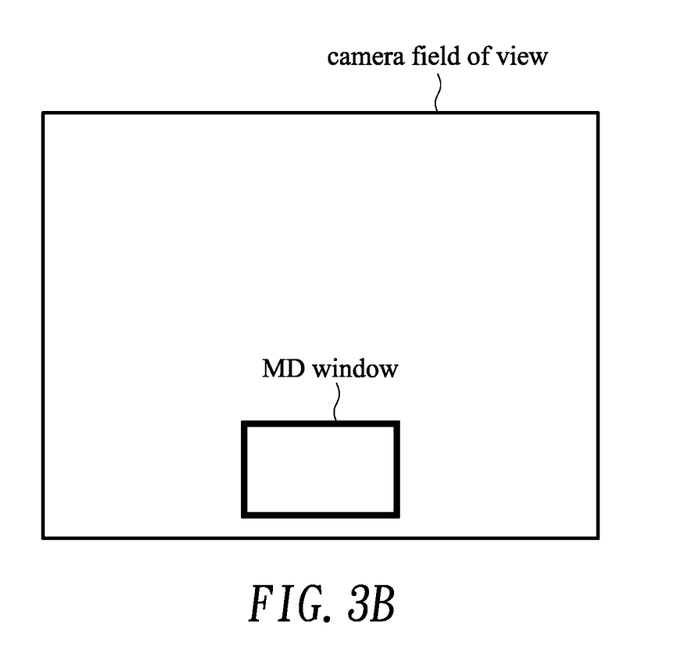

In the embodiment, the system 100 may include a motion detector (MD) 14 coupled to receive a current image captured by the camera 11 and a preceding image stored in the memory 12, and configured to detect a temporal change on a predetermined motion-detection (MD) window between the current image and the preceding image. In addition to the captured image, the memory 12 may also temporarily store data (e.g., feature extraction or edge map) generated by the motion detector 14. FIG. 3A shows an exemplary motion-detection window that is located at an upper portion of the FOV of the camera 11 (or the captured image) adaptable to the case shown in FIG. 2B to detect the near-distance human such that middle-distance or far-distance human will not be falsely detected because the middle-distance or far-distance human is not in the close proximity of the camera 11. FIG. 3B shows an exemplary motion-detection window that is located at a lower portion of the FOV of the camera 11 (or the capture image) adaptable to the case shown in FIG. 2C to detect the near-distance human such that far-distance human will not be falsely detected. According to a motion-detection result, the motion detector 14 may output a motion-detection signal MD that is asserted (e.g., "1") when the temporal change is greater than a predetermined threshold, or is de-asserted (e.g., "0") when the temporal change is not greater than the predetermined threshold. The motion detector 14 may adopt conventional motion-detection techniques, details of which are thus omitted for brevity. Although the motion detector 14 is exemplified in the embodiment, it is appreciated that it may be generalized to a proximity detector configured to detect motion of an object (e.g., human) based on motion, temporal change. The proximity detector may output a proximity-detection signal according to a proximity-detection result.

According to another aspect of the embodiment, the system 100 may include a fusion unit 15 coupled to receive the face-detection signal FD (from the face detector 13) and the motion-detection signal MD (from the motion detector 14), according to which a human-presence signal HP may be outputted and used, for example, to trigger or wake up an electronic device 101. Specifically, in the embodiment, the human-presence signal HP (generated by the fusion unit 15) is asserted when the face-detection signal FD (from the face detector 13) or the motion-detection signal MD (from the motion detector 14) is asserted, otherwise the human-presence signal HP is de-asserted. Generally speaking, the fusion unit 15 may output an object-presence signal according to the appearance-detection signal (from the appearance-based detector) and the proximity-detection signal (from the proximity detector).

Figure 4:
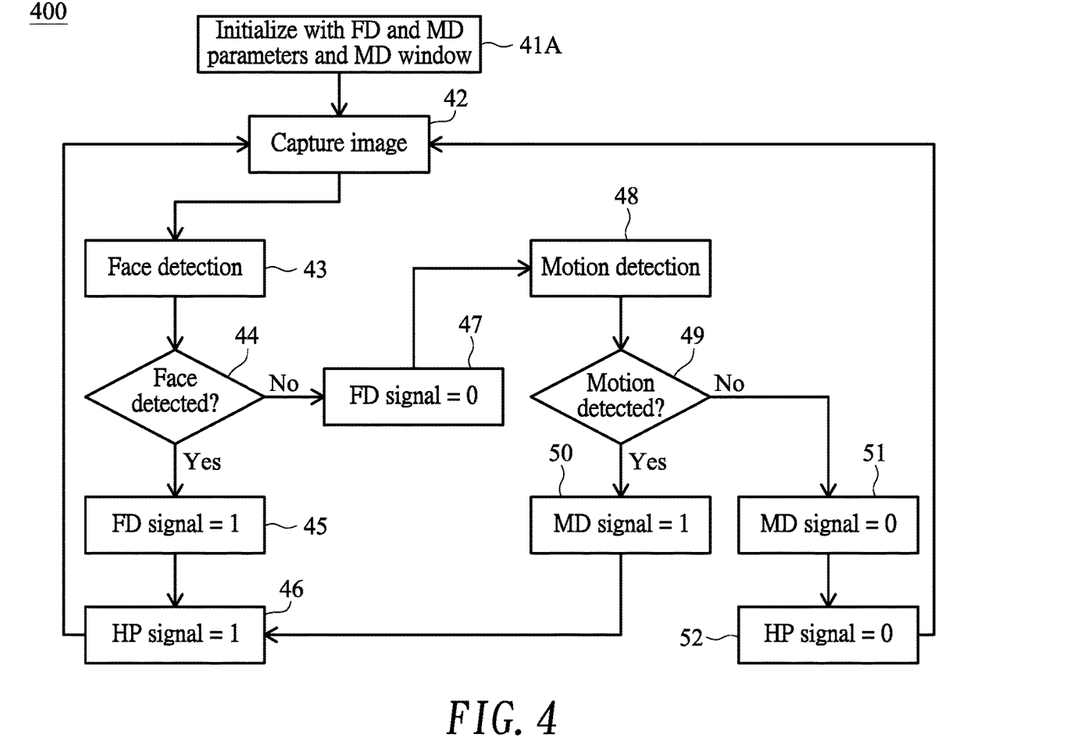
FIG. 4 shows a flow diagram illustrating a human presence detection method according to the first embodiment of the present invention.

FIG. 4 shows a flow diagram illustrating a human presence detection method 400 according to the first embodiment of the present invention. In step 41A, the face detector 13 and the proximity detector 14 may be initialized by face-detection and motion-detection parameters. Particularly, a motion-detection window may be set at an end (e.g., upper) portion of the FOV of the camera 11. Subsequently, in step 42, the camera 11 may capture an image, which may be temporarily stored in the memory 12.

In step 43, the face detector 13 may perform face detection to detect a face in the captured image. In one embodiment, down sampling may be first performed on the image before executing face detection. If the face is detected (step 44), an asserted face-detection signal FD is outputted by the face detector 13 (step 45), followed by outputting an asserted human-presence signal HP by the fusion unit 15 (step 46).

If no face is detected (step 44), a de-asserted face-detection signal FD is outputted by the face detector 13 (step 47). Next, in step 48, the motion detector 14 may perform motion detection to detect a temporal change on the predetermined motion-detection window between the current image and the preceding image. If motion is detected (step 49), for example, the temporal change is greater than a predetermined threshold, an asserted motion-detection signal MD is outputted by the motion detector 14 (step 50), followed by outputting an asserted human-presence signal HP by the fusion unit 15 (step 46). If no motion is detected (step 49), for example, the temporal change is not greater than the predetermined threshold, a de-asserted motion-detection signal MD is outputted by the motion detector 14 (step 51), followed by outputting a de-asserted human-presence signal HP by the fusion unit 15 (step 52) and the flow goes back to step 42 to capture a next image. Although face detection (step 43) is performed before motion detection (step 48) in the embodiment, it is appreciated that, in another embodiment, the motion detection (step 48) may be performed before face detection (step 43), or alternatively face detection (step 43) and motion detection (step 48) may be concurrently performed.

Figure 5:
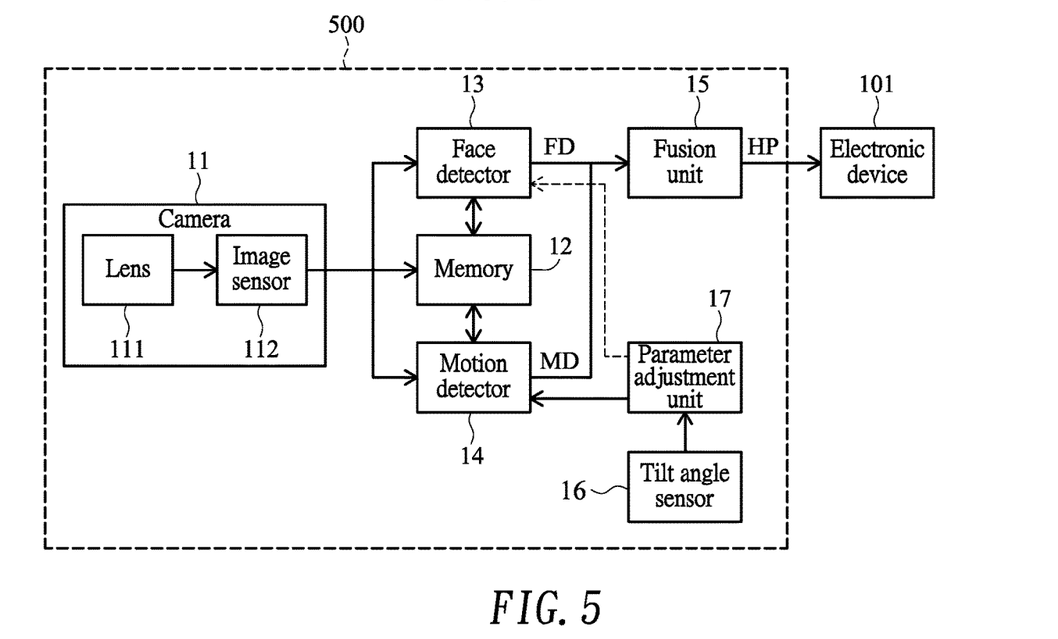
FIG. 5 shows a block diagram illustrating a human presence detection system according to a second embodiment of the present invention.

FIG. 5 shows a block diagram illustrating a human presence detection system 500 according to a second embodiment of the present invention. The human presence detection system (system hereinafter) 500 is similar to the system 100 (FIG. 1) with the following exceptions.

In the embodiment, the system 500 may include a tilt angle sensor 16 configured to sense the tilt angle of the camera 11, for example, by sensing the angle of the camera 11 or a screen (or a display device or module) on which the camera 11 is disposed, to generate tilt angle information according to the sensed tilt angle.

Figure 6A:
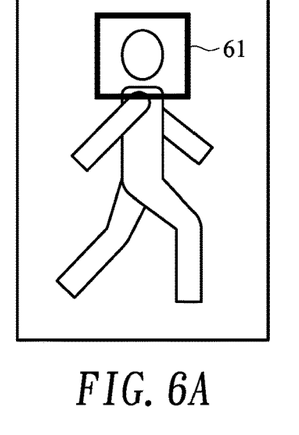
FIG. 6A to FIG. 6C show exemplary captured images and associated motion-detection windows.
Figure 6B:
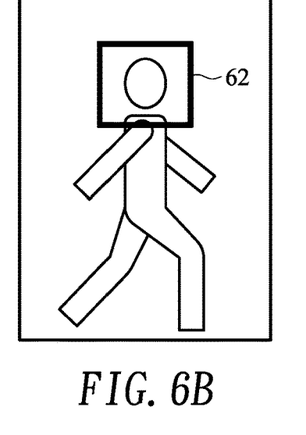
Figure 6C:
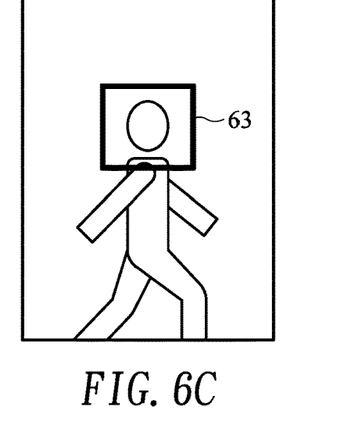

According to one aspect of the embodiment, the system 500 may include a parameter adjustment unit 17 coupled to receive the tilt angle information, according to which modified motion-detection parameters including a modified motion-detection window may be generated and fed to the motion detector 14. FIG. 6A to FIG. 6C show exemplary captured images and associated motion-detection windows 61 through 63. The camera 11 of FIG. 6B is tilted at a tilt angle larger than that in FIG. 6A, and the motion-detection window 62 is thus set at a lower position than that in FIG. 6A. Similarly, the camera 11 of FIG. 6C is tilted at a tilt angle larger than that in FIG. 6B and FIG. 6A, and the motion-detection window 63 is thus set at a lower position than that in FIG. 6B and FIG. 6A.

In one embodiment, the parameter adjustment unit 17 may further output modified face-detection parameters to the face detector 13 according to the tilt angle information. Accordingly, the face detector 13 may properly detect the face when the tilt angle of the camera 11 changes.

Figure 7:
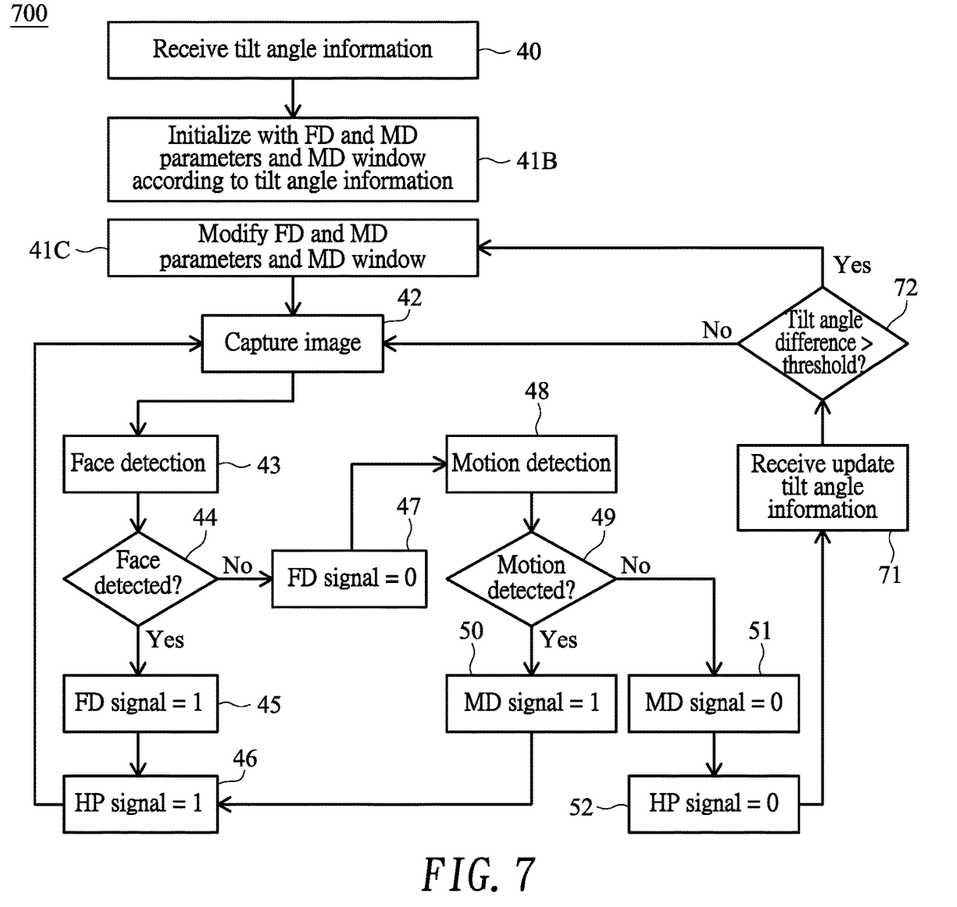
FIG. 7 shows a flow diagram illustrating a human presence detection method according to the second embodiment of the present invention.

FIG. 7 shows a flow diagram illustrating a human presence detection method 700 according to the second embodiment of the present invention. The flow of FIG. 7 is similar to the flow of FIG. 4 with the following exceptions.

In step 40, the parameter adjustment unit 17 may receive tilt angle information from the tilt angle sensor 16. Next, in step 41B, the face detector 13 and the proximity detector 14 may be initialized by face-detection and motion-detection parameters according to the tilt angle information. Particularly, a motion-detection window may be set at an end (e.g., upper) portion of the FOV of the camera 11 according to the motion-detection parameters.

After step 52 in which a de-asserted human-presence signal HP is outputted by the fusion unit 15, the flow goes to step 71 to receive update tilt angle information according to an update tilt angle sensed by the tilt angle sensor 16. In step 72, it determines whether a difference between the update tilt angle and the previous tilt angle is greater than a predetermined threshold. If the result of step 72 is positive, the flow goes to step 41C to modify (or set) face-detection parameters and motion-detection parameters including a modified motion-detection window generated according to the update tilt angle information. If the result of step 72 is negative, the flow goes to step 42 to capture a next image. In an alternative embodiment, steps 71-72 may be performed periodically and be independent of step 52.

Figure 8A:
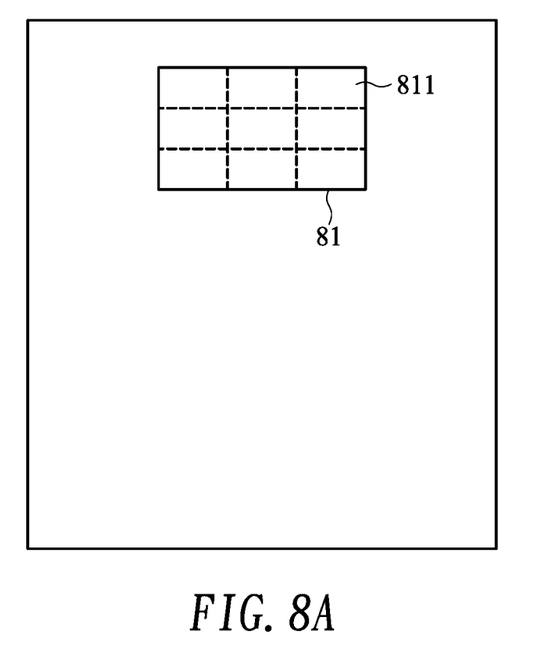
FIG. 8A schematically shows an exemplary motion-detection window in a field of view (FOV) of the camera according to a third embodiment of the present invention.

FIG. 8A schematically shows an exemplary motion-detection window 81 in a field of view (FOV) of the camera 11 according to a third embodiment of the present invention. According to one aspect of the embodiment, the motion-detection window 81 may include a plurality of sub-windows 811, according to which a motion-detection signal MD may be outputted (by the motion detector 14).

Figure 8B:
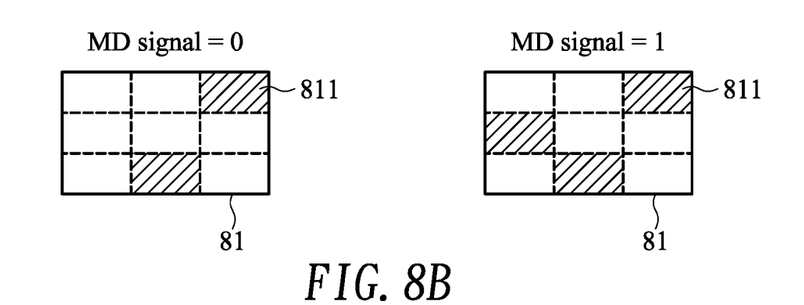
FIG. 8B and FIG. 8C shows exemplary embodiments adopting sub-windows of FIG. 8A.

FIG. 8B shows a first exemplary embodiment adopting sub-windows 811 of FIG. 8A. Specifically, the motion-detection signal MD is asserted when a number of motion-detected sub-windows (hatched area) 811 (i.e., the sub-windows 811 in which motion is detected) is equal to or greater than a predetermined value (e.g., 3 in this example), otherwise the motion-detection signal MD is de-asserted.

Figure 8C:
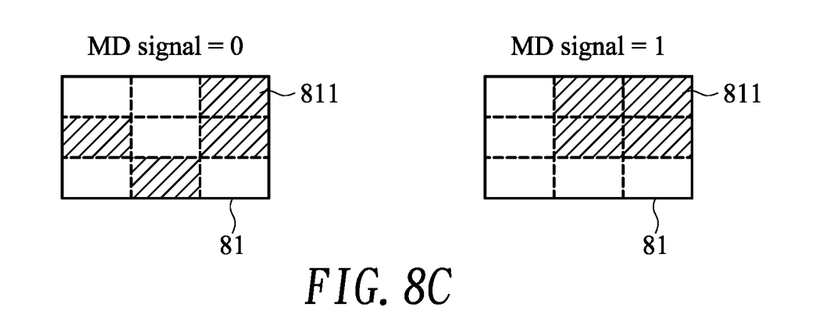

FIG. 8C shows a second exemplary embodiment adopting sub-windows 811 of FIG. 8A. Specifically, the motion-detection signal MD is asserted when adjacent motion-detected sub-windows (hatched area) 811 have a size being equal to or greater than a predetermined size (e.g., 2x2 in this example), otherwise the motion-detection signal MD is de-asserted.

Figure 9:
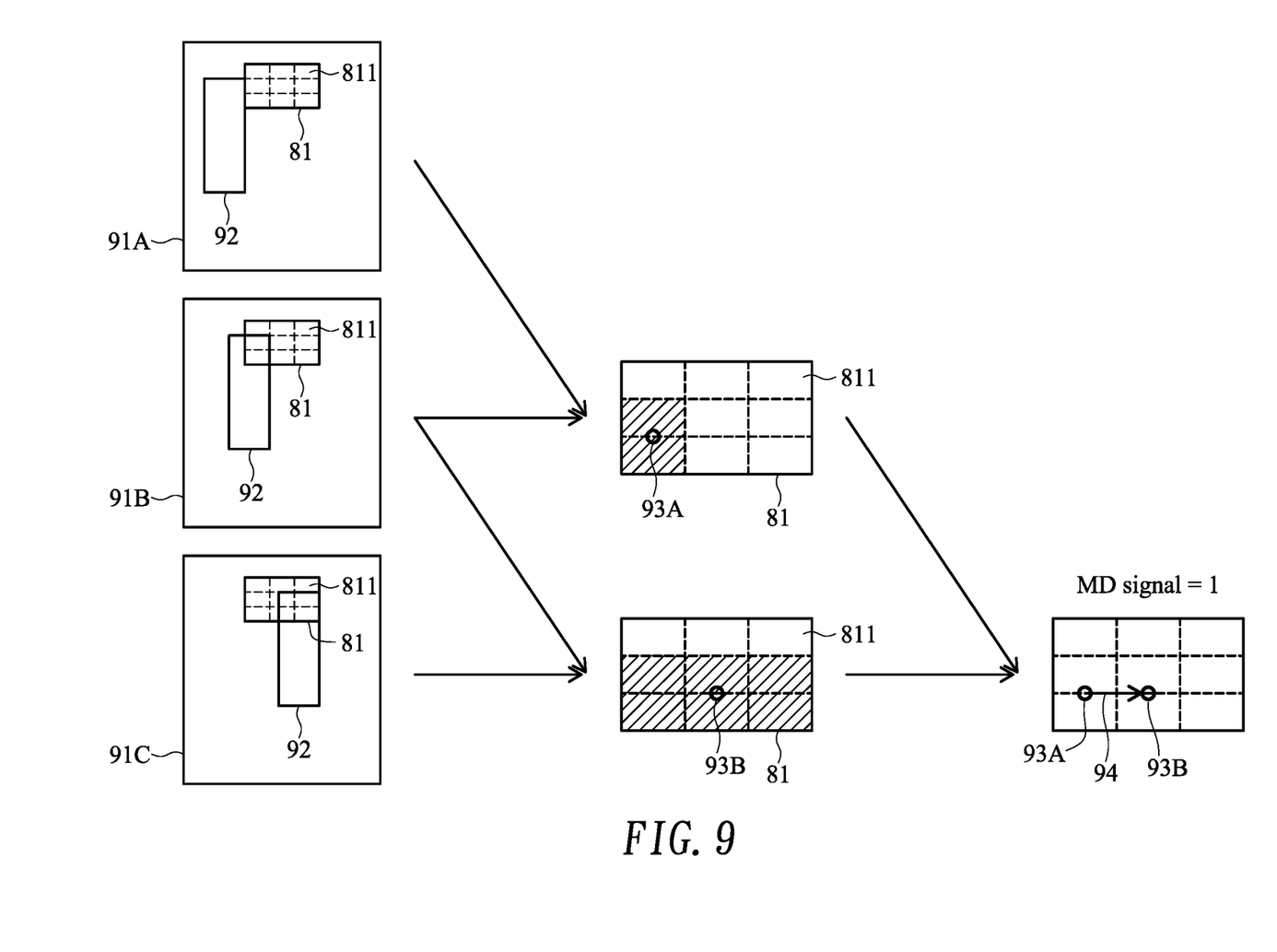
FIG. 9 schematically shows consecutive frames and a motion-detection window according to a fourth embodiment of the present invention.

FIG. 9 schematically shows consecutive frames (or images) 91A-91C (captured by the camera 11) and a motion-detection window 81 (and constituent sub-windows 811) according to a fourth embodiment of the present invention. According to one aspect of the embodiment, the motion-detection signal MD may be outputted (by the motion detector 14) according to a motion pattern (e.g., motion trajectory) of an object 92.

Specifically, in-motion sub-windows (hatched area) 811 for each pair of consecutive frames are firstly determined. As exemplified in FIG. 9, in-motion sub-windows (hatched area) 811 between the frames 91A and 91B are determined, and in-motion sub-windows (hatched area) 811 between the frame 91B and 91C are determined. Subsequently, a center 93A/93B of the in-motion sub-windows 811 for each pair of consecutive frames is determined. As exemplified in FIG. 9, a center 93A of the in-motion sub-windows of the frames 91A and 91B is determined, and a center 93B of the in-motion sub-windows of the frames 91B and 91C is determined. Finally, a motion trajectory 94 may be determined based on the determined centers 93A and 93B. As exemplified in FIG. 9, the motion trajectory 94 indicates that the object 92 moves toward a right direction. The motion-detection signal MD is asserted when the motion trajectory 94 conforms to a predetermined direction and magnitude, otherwise the motion-detection signal MD is de-asserted.

Although specific embodiments have been illustrated and described, it will be appreciated by those skilled in the art that various modifications may be made without departing from the scope of the present invention, which is intended to be limited solely by the appended claims.

What is claimed is:

1. A presence detection system, comprising:
a camera that captures an image;
an appearance-based detector that detects appearance of an object according to the image, thereby outputting an appearance-detection signal that is asserted when the appearance is detected;
a proximity detector that detects motion of the object on a predetermined detection window on the image, thereby outputting a proximity-detection signal that is asserted when the motion is detected; and a fusion unit that receives the appearance-detection signal and the proximity-detection signal, thereby outputting an object-presence signal that is asserted when the appearance-detection signal or the proximity-detection signal is asserted;

wherein the camera tilts at a tilt angle between an optical axis of the camera and a horizontal line being level with ground, and the detection window is located at an end portion of a field of view of the camera;

wherein the system further comprises a parameter adjustment unit that receives tilt angle information, according to which modified proximity-detection parameters including a modified detection window is generated and fed to the proximity detector.

2. The system of claim 1, further comprising:
a memory that stores the image or data generated by the proximity detector.

3. The system of claim 1, wherein the appearance-based detector comprises a face detector that detects a face of human, thereby outputting a face-detection signal that is asserted when the face of human is detected.

4. The system of claim 1, further comprising a frontal face detector, a frontal body detector or a frontal upper-body detector.

5. The system of claim 1, wherein the proximity detector comprises a motion detector that detects a temporal change on the detection window between a current image and a preceding image captured by the camera, thereby outputting a motion-detection signal that is asserted when the temporal change is greater than a predetermined threshold.

6. The system of claim 1, wherein the detection window comprises a plurality of sub-windows, and the proximity-detection signal is asserted when a number of sub-windows in which motion is detected is equal to or greater than a predetermined value.

7. The system of claim 1, wherein the detection window comprises a plurality of sub-windows, and the proximity-detection signal is asserted when adjacent sub-windows in which motion is detected have a size being equal to or greater than a predetermined size.

8. The system of claim 1, wherein the detection window comprises a plurality of sub-windows, and the proximity-detection signal is asserted when a trajectory of in-motion sub-windows conforms to a predetermined direction and magnitude.

9. The system of claim 1, wherein the asserted object-presence signal is used to trigger an electronic device.

10. The system of claim 1, further comprising:
a tilt angle sensor that senses the tilt angle of the camera to generate the tilt angle information according to the sensed tilt angle.

11. The system of claim 10, wherein the parameter adjustment unit outputs modified appearance-detection parameters to the appearance-based detector according to the tilt angle information.

12. The system of claim 11, wherein the modified proximity-detection parameters, the modified appearance-detection parameters and the modified detection window are generated when a difference between an update tilt angle and a previous tilt angle is greater than a predetermined threshold.

* * * * *

UNITED STATES PATENT AND TRADEMARK OFFICE
CERTIFICATE OF CORRECTION

| | |
|---|---|
| PATENT NO. | : 11,321,850 B2 |
| APPLICATION NO. | : 16/924673 |
| DATED | : May 3, 2022 |
| INVENTOR(S) | : Po-Chang Chen et al. |

It is certified that error appears in the above-identified patent and that said Letters Patent is hereby corrected as shown below:

In the Specification

In Column 1, Line 32, delete "US2004/0081998" and substitute therefor --US2004/0081338--

Signed and Sealed this
Fourth Day of April, 2023

Katherine Kelly Vidal
*Director of the United States Patent and Trademark Office*